US005705909A

United States Patent [19]

Rajashekara

[11] Patent Number: 5,705,909
[45] Date of Patent: Jan. 6, 1998

[54] CONTROL FOR AC MOTOR HAVING PARALLEL SETS OF THREE-PHASE WINDINGS WITH ONLY ONE CURRENT SENSOR PER SET

[75] Inventor: Kaushik Rajashekara, Carmel, Ind.

[73] Assignee: General Motors Corporation, Detroit, Mich.

[21] Appl. No.: 570,389

[22] Filed: Dec. 14, 1995

[51] Int. Cl.$^6$ .................................................. H02P 7/00
[52] U.S. Cl. .................................. 318/801; 363/71
[58] Field of Search .............................. 318/799–815, 318/727; 363/41, 54–56, 65, 71

[56] References Cited

U.S. PATENT DOCUMENTS

| | | | |
|---|---|---|---|
| 3,624,472 | 11/1971 | Graham | 318/801 |
| 3,800,211 | 3/1974 | Tracy | 321/9 A |
| 3,832,625 | 8/1974 | Gyugyi | 322/47 |
| 4,047,083 | 9/1977 | Plunkett | 318/801 |
| 4,314,190 | 2/1982 | Walker et al. | 318/789 |
| 4,349,772 | 9/1982 | Weiss | 318/799 |
| 4,418,309 | 11/1983 | Bose | 318/803 |
| 4,442,393 | 4/1984 | Abbondanti | 318/802 |
| 4,455,522 | 6/1984 | Lipo | 318/809 |
| 4,644,458 | 2/1987 | Harafuji et al. | 363/71 X |
| 4,707,651 | 11/1987 | Schauder | 318/800 |
| 4,862,054 | 8/1989 | Schauder | 318/800 |
| 5,212,630 | 5/1993 | Yamamoto et al. | 363/71 |
| 5,389,749 | 2/1995 | Hokari et al. | 318/800 |

*Primary Examiner*—Jonathan Wysocki
*Attorney, Agent, or Firm*—Robert M. Sigler

[57] ABSTRACT

A control for an AC motor has first and second sets of three-phase stator windings wound physically in parallel and a three-phase inverter for each set. A first current sensor is responsive to a first phase current of the first set of three-phase stator windings; and a second current sensor is responsive to a phase current of the second set of three-phase windings other than that corresponding to the first phase current of the first set of three-phase windings. The control is responsive to signals from the first and second current sensors to generate a set of motor phase voltage control signals, which are provided to first and second three-phase inverters connected across a source of DC electric power. The first three-phase inverter uses semiconductor switches responsive to the set of motor phase voltage control signals to generate operating voltages in the first set of three-phase windings; and the second three-phase inverter uses semiconductor switches responsive to the set of motor phase voltage control signals to generate operating voltages in the second set of three-phase windings. The control thus eliminates two current sensors, two current controllers and a PWM pulse generator of the prior art for a reduction in cost and improvement in reliability.

5 Claims, 3 Drawing Sheets

CONTROL FOR AC MOTOR HAVING PARALLEL SETS OF THREE-PHASE WINDINGS WITH ONLY ONE CURRENT SENSOR PER SET

BACKGROUND OF THE INVENTION

The technical field of this invention is the control of AC propulsion motors, such as those used in electric vehicle applications. Propulsion motors for electric vehicle and similar applications must provide high power from a DC source, such as a high voltage battery pack. The DC power is converted to AC for the motor in a three-phase power inverter, which is capable of varying frequency and voltage to control the speed and torque of the motor. In the inverter, power MOSFETs or, more recently, IGBTs, are switched at frequencies of 15-20 KHz to obtain the required output pulse width pattern.

The power requirement for an electric vehicle propulsion system ranges from 70-160 KW. Power switching modules handling greater than 100 KW are not generally available; and such power must therefore be controlled by two power switching modules in parallel. However, when two IGBTs or power transistors are connected in parallel, their voltage drops and switching characteristics must be properly matched or their current sharing will not be equal, which could lead to failure of the devices. To avoid this problem, the motor stator windings are separated into two sets of three-phase windings, each controlled by a separate inverter. Such systems use two separate control units—one for each set of phase windings—for a total of at least four current sensors, four current controllers, two PWM pulse generators and two three-phase inverters.

SUMMARY OF THE INVENTION

The motor control of this invention combines portions of the dual control units of the prior art. Although it uses two sets of phase windings and three-phase inverters, it uses only a two current sensors, two current controllers and a single PWM pulse generator. One of the two current sensors is responsive to current in one of the first set of phase windings and the other of the current sensors is responsive to current in one of the second set of phase windings which does not correspond in phase with the one of the first set of phase windings. The single PWM pulse generator provides a single set of gating signals to each of the three-phase inverters and thus produces substantially the same phase voltages in each of the first and second sets of three-phase windings, which are wound physically in parallel on the stator. The apparatus eliminates two current sensors, two current controllers and a PWM pulse generator of the prior art for a reduction in cost and improvement in reliability.

DESCRIPTION OF A PREFERRED EMBODIMENT

Figure 1:
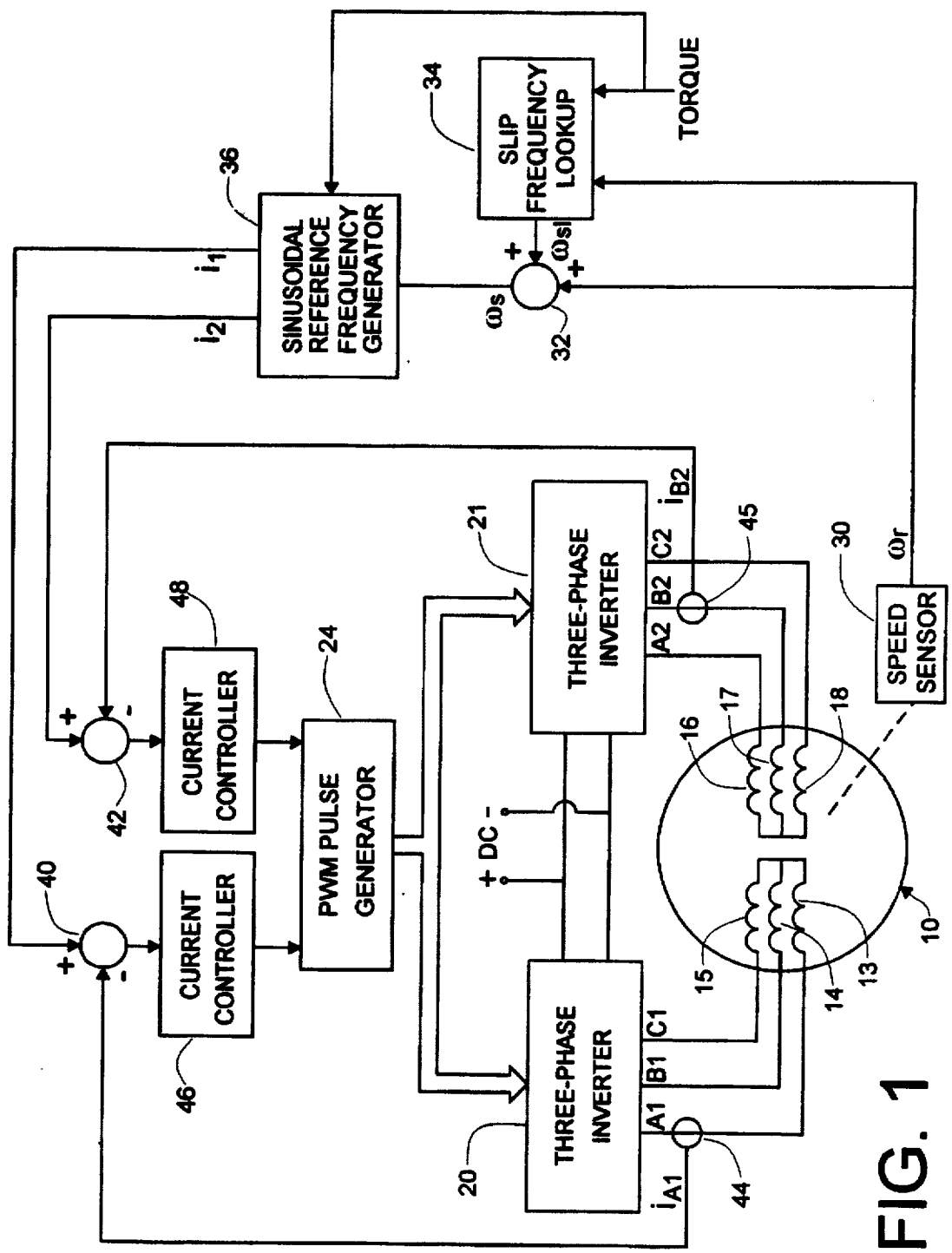
FIG. 1 shows a first embodiment of the invention in a scalar induction motor control.

Referring to FIG. 1, an AC induction motor 10 has a standard squirrel cage rotor, not shown, and a stator with a first set of three wye-connected phase windings 13, 14 and 15 for phases A1, B1 and C1, respectively. Windings 13, 14 and 15 are driven by a three-phase inverter 20, which switches a DC voltage with IGBTs or similar semiconductor switches in a standard 6 switch bridge arrangement to generate sinusoidal voltages in windings 13, 14 and 15 separated in phase by 120°. The stator of motor 10 further comprises another set of three wye-connected phase windings 16, 17 and 18, which are wound physically in parallel with windings 13, 14 and 15 on the stator of motor 10 but are electrically isolated therefrom and driven by another three-phase inverter 21 in a similar manner from the same DC source. In an electric vehicle application, motor 10 is a propulsion motor and the DC source may be a 300 volt battery pack.

A PWM pulse generator 24 generates a single set of 6 timed gating signals in a manner well known in the art of motor control to produce three sinusoidally varying voltages phase shifted by 120° from each other; and the set is provided to each of three-phase inverters 20 and 21. As known in the prior art, the two sets of phase windings 13-15 and 16-18 are wound physically parallel on the stator of motor 10 such that, when each set is provided the same signals from PWM pulse generator 24, corresponding phase windings between the two sets have a nominally zero phase difference: that is, the currents and voltages in A1 and A2 are in phase, and similarly for phases B and C. Thus, the sets of stator windings 13-15 and 16-18 produce magnetic field vectors in phase with each other to form a single rotating stator field having the combined strength of the two magnetic fields.

FIG. 1 shows a simple scalar induction motor control for motor 10. A rotor speed sensor 30 provides a rotor frequency signal $\omega_r$ to a summing junction 32. In response to input commanded TORQUE signal and the rotor frequency signal $\omega_r$ from speed sensor 30, a slip frequency lookup table 34 provides a desired slip frequency signal $\omega_{sl}$ to summing junction 32, which adds rotor frequency $\omega_r$ and slip frequency $\omega_{sl}$ to produce an output commanded stator frequency signal $\omega_s$. The commanded stator frequency signal $\omega_s$ is provided, along with the input commanded TORQUE signal, to a sinusoidal reference frequency generator 36, which produces a pair of commanded current signals $i_1$ and $i_2$, separated in phase by 120°, for two of the three phase windings of each set. The commanded current signals $i_1$ and $i_2$, which are each sinusoidal with a frequency of $\omega_s$ and an amplitude which is a function of desired torque, are provided to summing junctions 40 and 42, respectively.

A current sensor 44 is responsive to the phase current in one of the set of phase windings 13-15 (in this embodiment winding 13) to provide a current signal $i_{A1}$ which is subtracted from commanded current signal $i_1$ in summing junction 40. Although phase current A1 in winding 13 is shown in this embodiment, any of the currents A1, B1 or C1 could have been chosen. The resulting difference signal is processed in a current controller 46, which may be, for example, a standard proportional/integral (PI) controller, to provide a first control signal to PWM pulse generator 24. Likewise, a current sensor 45 is responsive to the phase current in one of the other set of windings 16-18 (in this embodiment winding 17), the winding being one of the two which does not correspond in phase to the winding in the set of windings 13-15 chosen for current sensor 44. Since phase A was chosen for current sensor 44, either of phases B or C could have been chosen for current sensor 45.

The output of current sensor 45, phase current signal $i_{B2}$, is subtracted from current signal $i_2$ in summing junction 42. The resulting difference signal is processed in a current controller 48, which may be a standard PI controller, to provide a second control signal to PWM pulse generator 24, wherein they are used to generate the set of 6 gating signals provided to each of three-phase inverters 20 and 21. These signals operate motor 10 according to the input commanded TORQUE signal at power levels above the capacity of a single three-phase inverter without the necessity of two separate complete control units.

Figure 2A:
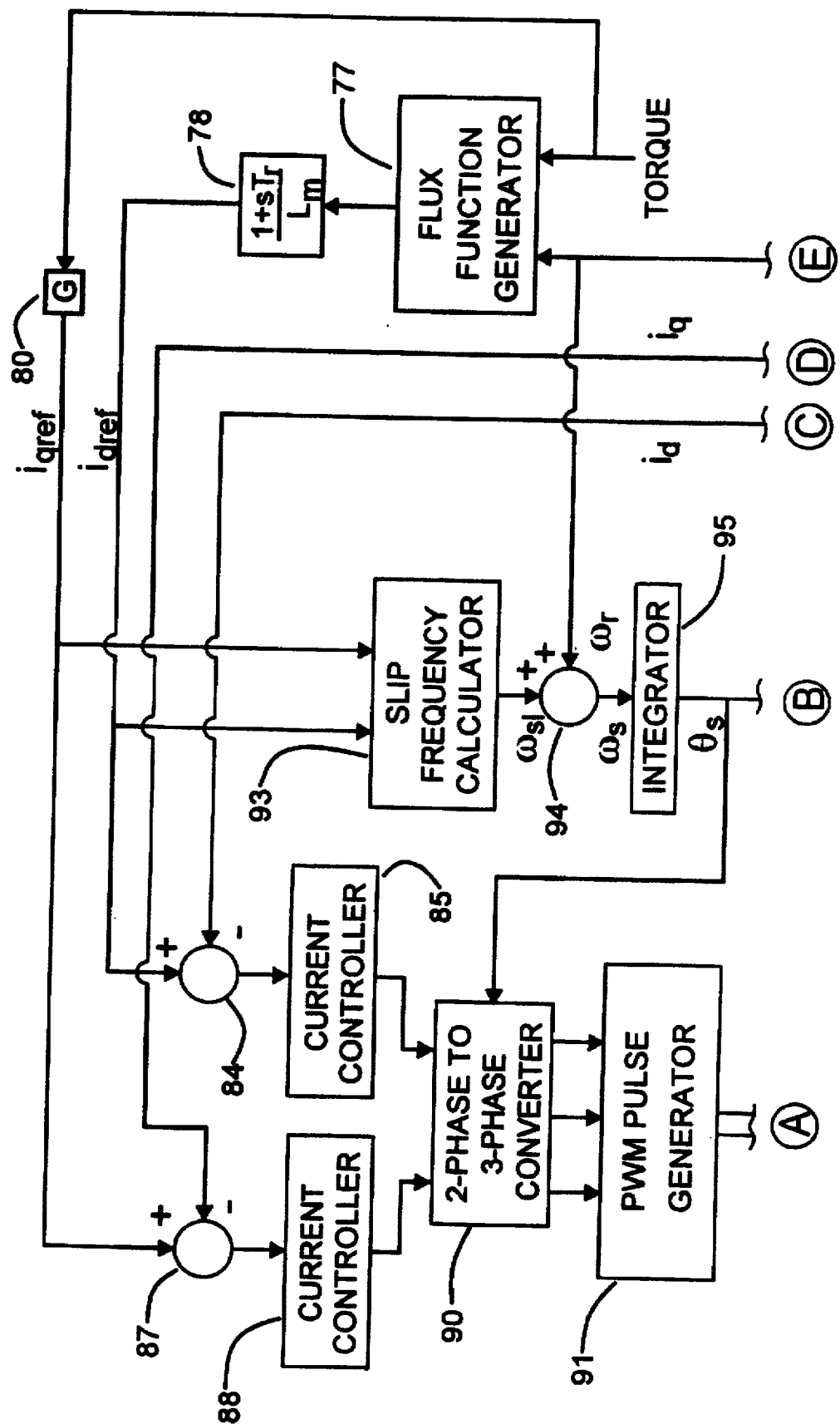
FIG. 2a and 2b show a second embodiment of the invention in a vector induction motor control.
Figure 2B:
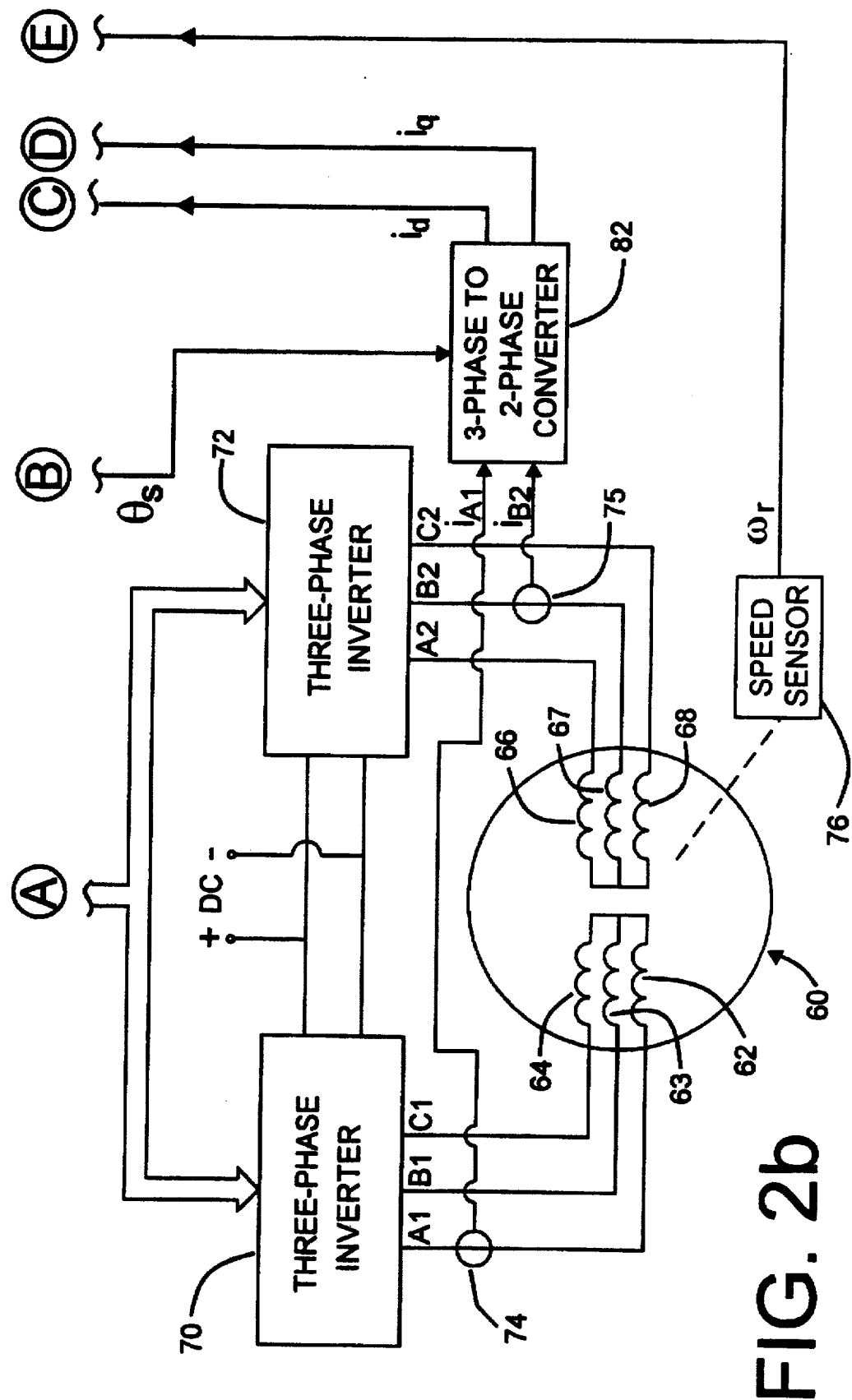

FIG. 2a and 2b show a vector control for a three-phase induction motor 60 similar to motor 10 of FIG. 1. Motor 60 has a stator with a set of three wye-connected phase windings 62, 63 and 64 for phases A1, B1 and C1, respectively, which are driven by three-phase inverter 70. The stator of motor 60 has another set of three wye-connected phase windings 66, 67 and 68 for phases A2, B2 and C2, respectively, which are driven by three-phase inverter 72. Current sensors 74 and 75 provide signals of the currents in non-corresponding phase windings from each of the sets, such as winding 62 (A1) and winding 67 (B2), as in motor 10 of FIG. 1.

A rotor speed sensor 76 provides a rotor speed or frequency signal $\omega_r$ to a flux function generator (or lookup table) 77, which also receives an input commanded TORQUE signal. On the basis of these two input signals, flux generator 77 generates a commanded stator flux value which is transformed to a reference current $i_{dref}$ in a processing block 78, characterized by the following transfer function:

$$\frac{1+sT_r}{L_m}$$

wherein $T_r$ is the rotor electrical time constant and $L_m$ is the mutual inductance between the rotor and stator of motor 10. The output $i_{dref}$ of processing block 78 is one of a pair of orthogonal d–q reference currents generated by the commanded inputs to the control. The commanded input TORQUE signal is scaled in a gain block 80 to form the other of the pair of orthogonal d–q reference currents $i_{qref}$.

The sensed current signals from current sensors 74 and 75 are transformed in a standard 3-phase to 2-phase converter 82 into the equivalent orthogonal current signals $i_d$ and $i_q$ in the d–q reference frame. Current signal $i_d$ is subtracted from the reference current signal $i_{dref}$ in a summing junction 84; and the output difference signal is provided to a current controller 85, which may be a standard proportional/integral (PI) controller. Likewise, current signal $i_q$ is subtracted from the reference current signal $i_{qref}$ in a summing junction 87; and the output difference signal is provided to a current controller 88, which may similarly be a standard PI controller. The output voltage signals of controllers 85 and 88 are provided to a standard 2-phase to 3-phase converter 90, wherein they are transformed into commanded three-phase voltage signals. These commanded voltage signals are provided to PWM pulse generator 91, which generates a set of 6 gating signals and provides the set to each of three-phase inverters 70 and 72.

Commanded reference current signals $i_{dref}$ and $i_{qref}$ are provided to a slip frequency calculator 93, which generates therefrom, in a standard manner, a desired slip frequency signal $\omega_{sl}$. This signal is added to the rotor frequency signal $\omega_r$ from speed sensor 76, in a summing junction 94, to produce a commanded stator frequency signal $\omega_s$; and this signal is integrated in integrator 95 to produce a commanded stator angle signal $\theta_s$. The commanded stator angle signal $\theta_s$ is provided to 2-phase phase to 3-phase converter 90 and 3-phase to 2-phase converter 82 to determine the unit vectors required for vector rotation therein.

I claim:

1. A control for an AC motor having a rotor and first and second sets of three-phase stator windings wound physically in parallel, the control comprising, in combination:

a first current sensor responsive to a first phase current of the first set of three-phase stator windings;

a second current sensor responsive to a phase current of the second set of three-phase windings other than that corresponding to the first phase current of the first set of three-phase windings;

means responsive to the first and second current sensors and to no other current sensors in either of the first and second sets of three-phase stator windings for generating a single set of motor phase voltage control signals;

a source of DC electric power;

a first three-phase inverter comprising semiconductor switches connected across the source of DC power and responsive to the single set of motor phase voltage control signals to generate operating voltages in the first set of three-phase windings; and a second three-phase inverter comprising semiconductor switches connected across the source of DC power and responsive to the single set of motor phase voltage control signals to generate operating voltages in the second set of three-phase windings.

2. The control of claim 1 in which the means for generating a single set of motor phase voltage control signals is not responsive to any current sensors but the first and second current sensors.

3. The control of claim 1 in which the means for generating a set of motor phase voltage control signals comprises:

means responsive to the first and second current sensors for generating a pair of motor current signals;

means responsive to an input torque signal for generating a corresponding pair of current reference signals;

means for deriving a pair of difference signals from corresponding ones of the pair of motor current signals and the pair of current reference signals;

means for processing each of the pair of difference signals; and a single PWM pulse generator responsive to the pair of difference signals to generate the single set of motor phase voltage control signals for both the first and second three-phase inverters.

4. The control of claim 1 in which the means for generating a pair of motor current signals is not responsive to any current sensors but the first and second current sensors.

5. The control of claim 3 in which the means for generating a corresponding pair of current reference signals is further responsive to rotational speed of the motor.

* * * * *